United States Patent [19]

Giammarco et al.

[11] 4,186,181

[45] Jan. 29, 1980

[54] PROCESS FOR THE PRODUCTION OF HYDROGEN

[76] Inventors: Giuseppe Giammarco; Paolo Giammarco, both of S. Marco n.3242, Palazzo Morolin, Venice, Italy

[21] Appl. No.: 919,516

[22] Filed: Jun. 27, 1978

[30] Foreign Application Priority Data

Jun. 27, 1977 [IT] Italy ............................... 68483 A/77
Feb. 3, 1978 [IT] Italy ............................... 67218 A/78

[51] Int. Cl.² ............................................... C01B 1/13
[52] U.S. Cl. ..................................... 423/650; 252/373
[58] Field of Search ............... 423/650, 651, 652, 653, 423/654; 252/373

[56] References Cited

U.S. PATENT DOCUMENTS 3,545,926 12/1970 Schlinger et al. ..................... 423/652
3,684,689 8/1972 Patton et al. ......................... 423/652

*Primary Examiner*—O. R. Vertiz
*Assistant Examiner*—Wayne A. Langel
*Attorney, Agent, or Firm*—Sughrue, Rothwell, Mion, Zinn and Macpeak

[57] ABSTRACT

Improvements in the process for producing hydrogen in a plant comprising reforming units and shift conversion units. The residual heats obtained from the various units of the plant are used to heat an aqueous liquid to a temperature lower than the boiling temperature of water at the operating pressure of said units; the thus heated liquid is contacted with the process feeds to saturate the latter with steam; and the thus saturated process feeds are delivered to the reforming units. The quantity of steam supplied by the high pressure process boiler can be reduced accordingly.

9 Claims, 4 Drawing Figures

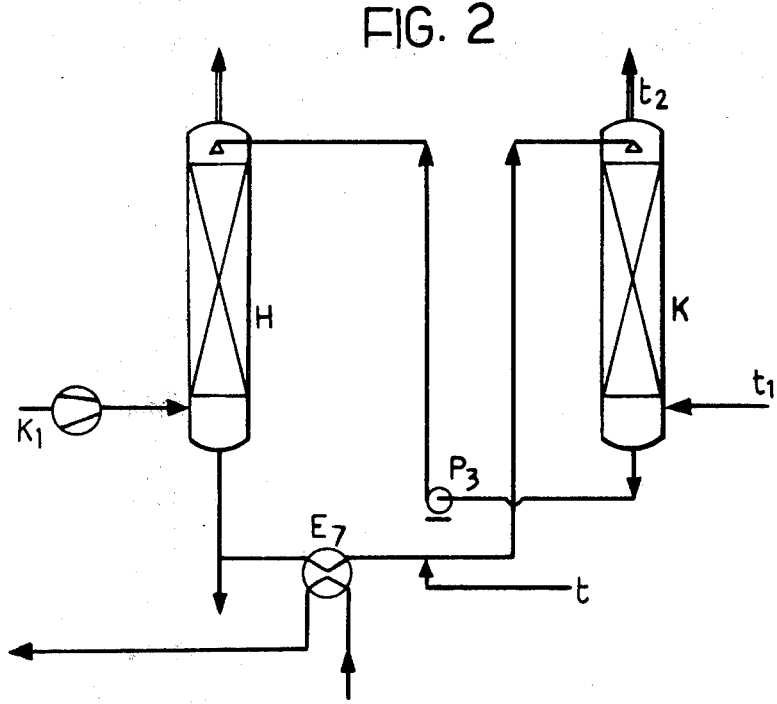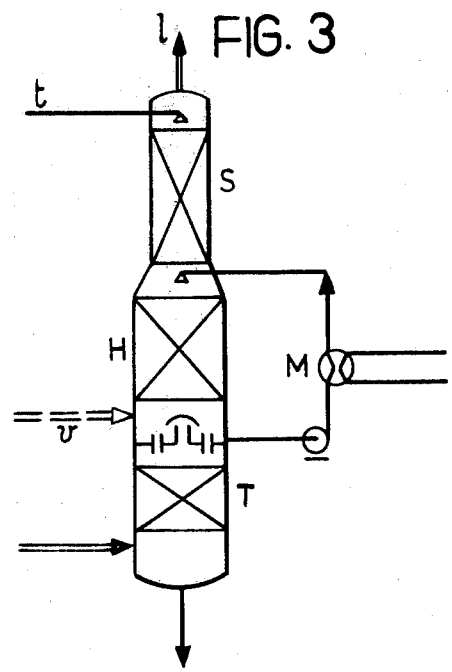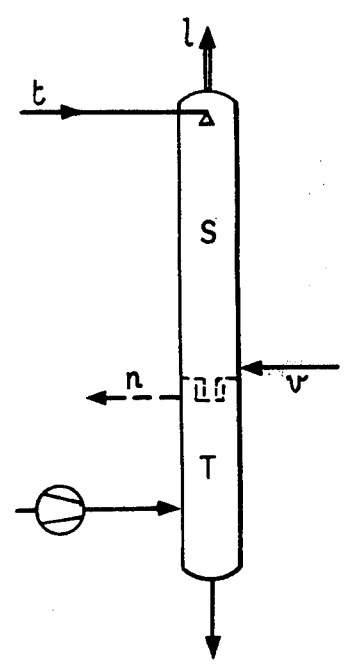

PROCESS FOR THE PRODUCTION OF HYDROGEN

The present invention relates to improvements in the processes for the production of hydrogen for use in the production of ammonia and methanol, in hydrogenation and oxo-synthesis reactions and the like. As is known, in these processes there is used a series of units, including gasification units and in particular reforming units (but also catalytic cracking units, partial combustion units and the like) in which combustible substances (such as methane, gaseous hydrocarbons, vaporized liquid hydrocarbons and the like) are reacted with steam at high temperatures, shift conversion units in which the reaction gases thus obtained are then reacted with a further amount of steam, and then a $CO_2$ and/or $H_2S$ removal unit provided with a suitable reboiler using preferably the heat present in the gas issuing from the conversion unit, and in which the steam necessary for the said reactions is produced in suitable boilers, called process boilers, by means of the waste heats obtained from the said units.

It is also known that the said units, and especially the boiler for the production of steam, are very often connected with steam turbines for the production of energy.

Furthermore, it is known that in said units the heat supplied from the outside (generally the heat obtained from the combustion of a combustible substance) is used in a first step to heat the reforming chamber in which methane or vaporized hydrocarbons are made to react with steam at a suitable temperature in the presence of catalysts, to produce the so-called process gas. The residual heat (namely the heat of the combustion gas, as well as that of the gas issuing from the reforming units) is then used either for the production of the steam necessary for the reaction in one or more suitable boilers (called process boilers), or in the subsequent shift conversion units and in the units for the removal of $CO_2$ and/or $H_2S$.

Finally, it is also known that the heat in excess with respect to the above requirements and in particular the low temperature waste heat, is recovered and recycled in the conventional art by using said heat for heating the boiler feed water (BFW). No other recovery method has been used until now.

It is important to note that noticeable improvements in the apparatus for removing $CO_2$ and/or $H_2S$ have been recently devised and used, these improvements permitting the heat consumption which in the prior art was about 1000-1200 Kcal/N m$^3$ $CO_2$, to be reduced down to 500-700 Kcal/N m$^3$; these improvements stem, among others, from the fact that the waste heats discharged to the outside from the apparatus for removing $CO_2$ and/or $H_2S$ (such as the heat issuing from the top of the regeneration column) are recovered and used in the system.

Accordingly, the process gas issuing from the low temperature shift conversion unit will have an excess of heat equal to about 300-500 Kcal/N m$^3$ $CO_2$ with respect to the requirements of the apparatus for removing $CO_2$ and/or $H_2S$. Therefore, the need is felt to recover and recycle this waste heat, which is saved with respect to the known art.

In the case of the recovery and re-utilization of the above waste heats, the conventional method based on the heating of the boiler feed water is inapplicable or at least very onerous, since said boiler feed water, in addition to its use for recycling various other waste heats which are available at various locations of the units for producing hydrogen, is also used in most cases to recycle the heat coming from the reactor for the synthesis of ammonia. It is therefore advisable to add to this conventional method a new recovery method, as suggested by the present invention.

An object of the present invention is therefore to reduce the heat consumption in the aforesaid units for the production of hydrogen and thus the combustible consumption by recovering and recycling the aforesaid waste heats, especially the heat saved by improving the apparatus for removing $CO_2$ and/or $H_2S$ and also the waste heats coming from the devices and apparatus which are used in the process of the present invention.

Another object, analogous with the preceding one, is to improve the so-called steam/carbon ratio, that is to increase the amount and concentration of the steam which is used in the chemical reactions of reforming and conversion, thus advantageously obtaining an improved yield without increasing the supply of steam and heat from the outside.

Another object is to produce a part of the steam to be used in the chemical reactions by means of the waste heats at lower temperatures (generally 150°-200° C.) than those which are on the contrary necessary in the conventional art to produce steam al 240°-300° C. in the process boiler.

A further object is to purify the condensates obtained from said units for the production of $H_2$ and from the related devices connected to the latter, by desorbing the impurities present in said condensates and carrying out the desorption at the operating pressure of the reforming units without any further consumption of external heat, to make said condensates usable as boiled feed water.

Therefore, the process of the present invention comprises the following steps:

(a) the heats contained in the gases and the liquids, issuing from the said units for the production of hydrogen, from the units connected to the latter and from the devices used in the present invention, which have already performed their function in said units and which, anyway, are at a lower temperature than the operating temperature in said units (called in the following waste heats) are recovered and used in a gradual manner in the order of their increasing temperatures to heat water, or another aqueous liquid, up to a temperature (generally 150°-200° C.) which is lower than the boiling temperature at the operating pressure in the reforming units and in the following units. Also useful for the purpose are the hot waters coming from the said units or from the devices used in the process of the present invention;

(b) the gases and/or the gaseous mixtures (such as methane, air, $CO_2$ and the like), which are called in the following process feeds, to be reacted with steam, are sent to a column (or zone), called in the following saturation column (or zone), without any pre-heating and at a low temperature (to recover and use the maximum amount of the waste heats defined in (a));

(c) the said process feeds of (b) are directly contacted in said saturation column with the hot or heated waters of (a), to saturate said process feeds with steam by means of said waters at a temperature (generally 150°-200° C.) lower than the boiling temperature at the operating pressure in the reforming units and in the following units;

(d) the mixture of process feeds and saturation steam obtained in (c) is used, if required, to purify, in direct contact and at the operating pressure of the reforming units, the condensates obtained from the units for the production of hydrogen and from the devices connected with the latter, thus removing the gaseous impurities present in said condensates and making the latter suitable for use as boiler feed water;

(e) the mixture of process feeds and saturation steam is suitably heated and sent to the reforming unit. (It should be noted that when the process feed is methane, possibly in mixture with $CO_2$, the mixture is first heated up to a temperature close to the boiling temperature of water at the operating pressure (generally 250° C.), a further amount of steam coming from the process boiler is then added and finally the whole is sent, upon further heating, to the reforming unit).

The above operative system permits the following advantages to be obtained:

(1) The process feeds (methane, air, $CO_2$ and the like) are sent to the saturation column at the lowest possible temperature, without any preliminary heating. This is important, since, due to their low temperature, these gases can cool to a higher extent the waters with which they are contacted, making possible the recovery of waste heats available at noticeably low temperatures. Moreover, the thermal recovery apparatus is less onerous.

(2) It is also recommended and claimed to saturate the said process feeds with steam by means of waters having a temperature (generally 150°–200° C.) lower than the boiling temperature at the reforming pressure. When operating as above, the saturation steam consumes for its vaporization waste heats at low temperatures, whereas the steam coming from the process boiler (which is replaced in part) is produced at a temperature of 250° C. (or about 300° C. when the steam is used for the production of energy). As a result there are used with advantage for the production of said saturation steam (which is sent to the reforming unit) heats which in the hitherto known art were inappropriate for the purpose.

Moreover, a further advantage derives from the noticeable decrease in heat exchange surfaces of the apparatus for the delivery of the vaporization heat.

(3) According to the present invention, the mixture of process feeds and saturation steam is used, before being delivered to the reforming unit, to purify in direct contact and at the operating pressure of reforming, the condensates of the said units for the production of hydrogen and of the devices connected with the latter, to remove from said condensates impurities such as $NH_3$, $CO_2$, methanol, amines and the like, which, as is known, are compatible with the catalysts used in the various reactions. It is also known that these impurities are cracked in said reactions. In the current art, on the contrary, the purification of said condensates (to use the latter as boiler feed waters or for ecological purposes) is very onerous, since it requires a quantity of stripping steam equal to about 250 kg/m$^3$ of water. This heat consumption is practically avoided, as clearly shown above. Moreover, the saturation steam can be produced from a part of said condensates, without using that highly pure water which is required in the high pressure boilers.

The said condensates comprise, in addition to the process condensates proper (such as the condensates obtained from the reboilers of the apparatus for removing $CO_2$ and/or $H_2S$) the overhead condensates of the coolers for $CO_2$ and/or $H_2S$ (where the mixture of steam and $CO_2$ and/or $H_2S$ issuing from the top of the regeneration column of said apparatus for removing $CO_2$ and/or $H_2S$, is cooled). Also included are the condensates of the devices which are connected with the various units for the production of hydrogen. It should be noted in this connection that in some cases the condensates of said units for the production of hydrogen (containing, as is known, impurities such as $NH_3$, $CO_2$, methanol, amines and the like) are purified in conventional steam stripping columns, at the top of which are located condensation and reflux coolers for the steam exited, with formation of condensates rich in those impurities which are removed from said purification columns. These condensates cannot be discharged to the outside for ecological reasons. The said condensates may also be delivered to the saturation column used in the process of the invention, alone or in mixture with condensates coming from other sources; in said saturation column the impurities present in the condensates are removed and delivered to the reforming unit.

Furthermore, the absorbent solutions used in the apparatus for removing $CO_2$ may also be treated and regenerated, with removal of $CO_2$ which is also compatible with the catalysts used in the various chemical reactions.

A condition which is fundamental to achieve the said results consists in the fact that said condensates or solutions can be purified at the operating pressure of reforming. The purification under such pressure conditions is envisaged for the first time in the art, since said purification is usually carried out at a pressure close to atmospheric. It has been experimentally ascertained that the depuration can be carried out satisfactorily even at the said operating pressure, provided that the desorbing mixture of process feeds and saturation steam has a temperature sufficient to contain the same quantity of stripping steam (about 250 kg steam/m$^3$ condensate) as that which is necessary for a purification carried out at a pressure close to atmospheric. The said quantity of heat can be produced, as repeatedly stated, by recovering and re-utilizing either the various waste heats coming from the units for the production of hydrogen, or else those which come from the devices used in the process of the present invention. In each case, the increase in temperature improves the coefficient of transfer of $CO_2$, thus facilitating expulsion of the latter.

Embodiments of the process of the present invention will now be described in detail, with reference to the accompanying drawings.

FIGS. 1 and 2 show plants for the production of hydrogen from natural gas (methane).

FIGS. 3 and 4 depict saturation columns suitable for use in the present invention.

Figure 1:
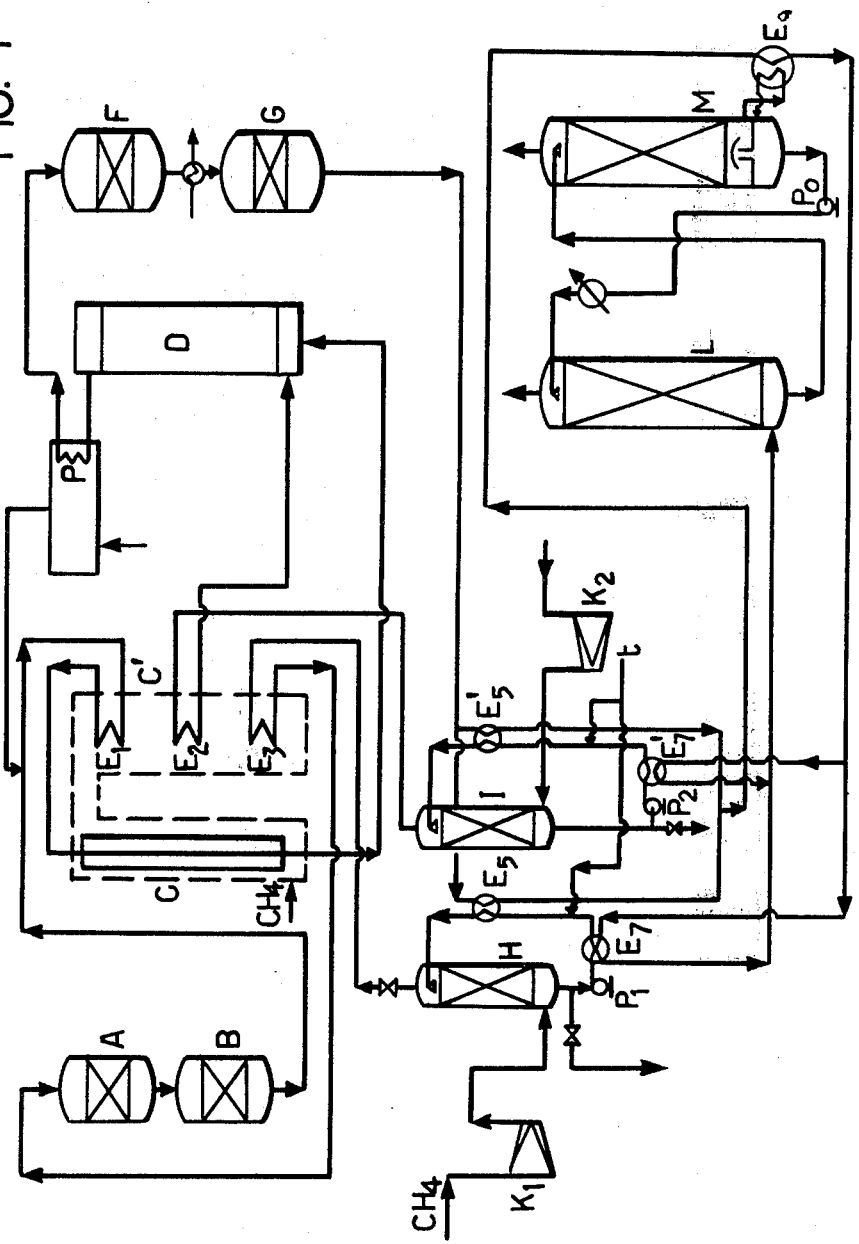

The embodiment shown in FIG. 1 refers to a plant for the production of hydrogen from natural gas (methane). This methane, upon suitable compression in compressor K1, is directly sent, without any preliminary heating, to the saturation column H, according to the process of the present invention. Said methane is treated in said column H with water (heated in various devices, as will be specified in the following), and thus heated and saturated with steam; generally, the saturation is carried out at a temperature of from 150° to 200° C. or at another temperature suitable for the purposes of the present process; said methane is then delivered to the heat recovery device E3, located in the chamber C', where it is further heated by means of the combustion fumes of reforming coming from chamber C; it is then passed, according to the conventional art, through the chambers A and B, where it is purified and desulfurated; it is then admixed with steam coming from the process boiler P and sent to the heat recovery device E1, which is also located in the chamber C', in which it is further heated up to a temperature suitable for the reforming reaction. It is finally sent to the primary reforming unit C, where the methane reacts at high temperature with steam, which consists in part of the saturation steam and in part of the steam coming from the process boiler. At the bottom of reforming chamber C methane or another combustible substances is burnt, and the combustion fumes, after having heated the reaction tubes of reforming chamber C, are then delivered to the chamber C', where they are used in the heat recovery devices E1, E2, E3, etc., for the production of steam. The gas submitted to reforming in chamber C is sent, if required, to the secondary reforming unit D in which a suitable amount of air is added to give the amount of nitrogen necessary for the ammonia synthesis, while the oxygen is burnt.

The air used for the secondary reforming is treated in the same manner as the methane. The air, upon suitable compression in compressor K2, is delivered, without any preliminary heating, to the saturation column I, where it is treated with water (heated in the heat recovery devices E'5 and E'7, as will be specified in the following), and thus saturated with steam; it is then delivered to the heat recovery device E2 located in the chamber C', where it is further heated by means of the combustion fumes, and finally delivered to the secondary reforming chamber D.

The gaseous mixture issuing from the reforming chamber, after having been used for the production of steam in the process boiler (this process boiler utilizing also the heat of the combustion gases according to the known art), is then delivered to the high temperature shift conversion chamber F and then to the low temperature shift conversion chamber G, according to the conventional art.

The gaseous mixture is then delivered to the apparatus for removing $CO_2$ and/or $H_2S$, comprising the absorption column L and the regeneration column M in which a suitable absorbent solution is circulated by means of pump Po. The heat necessary for the functioning of said apparatus substantially consists of the heat contained in the gas coming from the conversion unit, which is yielded in the reboiler E9.

The absorbent solutions used in said apparatus for removing $CO_2$ and/or $H_2S$ are alkali metal carbonate solutions, either simple or activated by addition of $As_2O_3$, glycine or similar aminoacids, ethanolamines; other suitable solutions are those of alkali metal phosphates, borates and phenates, and solutions of ethanolamine in water or in sulfolene.

The functioning of the above plant is well known to those skilled in the art; according to the process of the present invention, as shown in FIG. 1, there are added to the apparatus of the hitherto known art the zones or columns H and I in which the methane, and respectively the air, etc. are treated with water heated by means of the recovery of the waste heats, as shown in the FIGS. 1, 2, 3, 4.

With reference to FIG. 1, in column H in the case of methane and respectively in column I in the case of air, water is circulated in a closed circuit by means of pump P1 and pump P2 respectively. The water corresponding to the saturation water is introduced in the circuit by means of pipe t. The water discharged from the bottom of column H (and respectively from the bottom of column I) is first heated in the heat recovery device E7 (and respectively heat recovery device E'7) by means of the heat contained in the process gas issuing from the reboiler E9 of the apparatus for the removal of $CO_2$ and/or $H_2S$; it is then further heated in the heat recovery device E5 (and respectively heat recovery device E'5) by means of the heat contained in the process gas issuing from the low temperature shift conversion unit, before delivering said process gas to the reboiler E9. The water may then be further heated, for example by passing it through a suitable heater (not shown in the figure), using the combustion gases of chamber C'. There is in fact an important amount of excess heat when the boiler, in addition to the steam necessary for the reforming ad conversion, produces also steam for the turbine yielding electrical energy.

The water thus heated is used for heating and saturating the gaseous methane in column H, and respectively the air, or the $CO_2$, in column I.

It is obviously possible to use for the purpose the condensates obtained from the units for the production of hydrogen and from the devices connected with the latter; these condensates are already hot (120°–135° C.) and therefore the (residual) heat contained in these is used in the device described above, whereas said condensates are purified with removal of the gaseous impurities present in the latter.

It should be noted that the heat yielded by the water heated by means of the said waste heats, is delivered in the form of saturation steam to the reforming and conversion units. As a result the heat supplied to the system by the process boiler P, and thus the combustible consumption, are correspondingly reduced.

In many cases it is preferable to use the method based on the saturation of air, because air is available in higher amounts than methane and it is therefore possible to increase the quantity of saturation steam; the use of air is on the contrary necessary in the cases where the methane is not sufficiently pure and in the cases where the reforming unit is fed with naphta or other liquid hydrocarbons.

In these cases the saturation steam is delivered together with air to the secondary reforming unit, instead of being delivered to the primary reforming unit. This does not bring about noticeable drawbacks, because the saturation steam, in the process of the present invention, is only a small fraction (10–15%) of the total amount of steam delivered to the reforming.

It should also be noted that in the oxo-synthesis and similar processes the methane delivered to the saturation column and then to the reforming is in mixture with $CO_2$.

In other cases, if necessary, it is possible to use two separate saturation columns, for methane and for air respectively. This permits the recovery of waste heats to be noticeably increased.

The heat recovery devices shown in FIG. 1 can be eliminated or reduced by using the embodiment shown in FIG. 2.

In a plant for the production of hydrogen similar to that shown in FIG. 1 (and therefore not shown in FIG. 2), there is added a column H in which the methane compressed in compressor k1 is treated in direct contact with a stream of hot water to heat and saturate with steam said methane as specified in the foregoing.

In this case also the water issuing from column H, is heated in the heat recovery device E7 by means of the heat contained in the process gas issuing from the reboiler of the apparatus for the removal of $CO_2$ and/or $H_2S$; it is then further heated in column K by direct exchange with the process gas having a high temperature and a high steam content, which comes from the low temperature shift conversion unit and which is then delivered to the reboiler. The water may possibly be further heated by passing it through a suitable heater (not shown in the figure), using the combustion gases coming from chamber C'. The water is then taken up by means of pump P3 and delivered to column H, thus obtaining a circulation of water between columns H and K. The water corresponding to the saturation water is introduced by means of pipe t. It is possible to use for the purpose the condensates obtained from the plant for the production of hydrogen and from the devices connected with the latter. The process gas coming from the conversion unit is introduced at the bottom of column K by means of pipe $t_1$, passed through the said column and then discharged at the top by means of pipe $t_2$ and delivered to the reboiler of the apparatus for the removal of $CO_2$ and/or $H_2S$. In this manner the heat transfer between the process gas and the water circulating between column K for the heat recovery and column H for the utilization of said heat is carried out in a simple way and with little apparatus outlay. In particular, the heat exchanger E5 of FIG. 1 is eliminated.

The device shown in FIG. 2 is used in the case of methane; a similar device is also used in the case of air for the secondary reforming (and in the case of $CO_2$ for oxy-gas and methanol).

Another application relates to the utilization, for heating the water delivered to the saturation column, of the steam discharged from the prime-movers or counterpression turbines for the production of energy, which, as is known, are used in connection with plants for the production of hydrogen.

It is also possible to use other heats available at various points and zones of the complex of units for the production of hydrogen, such as for example the heat contained in the gas issuing from the high temperature conversion unit and to be delivered to the low temperature conversion unit, etc. In particular, as stated in the foregoing, it is also possible to use the waste heats obtained from the devices used in the process of the present invention. The said waste heats may be integrated by means of the addition of make-up steam coming from the process boiler, this addition being carried out to make possible the utilization of said waste heats, which could not be used independently in a suitable manner.

It should be noted in this connection that the recovery and the re-utilization of the waste heats are carried out in the process of the present invention by means of a new method (saturation of the process feeds), which can be used in combination with and in addition to the known method based on the BFW heating. It is therefore possible for the plant designer to select the most convenient recovery method and to select the waste heats which are most suitable for each of said methods, in each particular case.

The second object of the present invention, which consists in improving the so-called steam/carbon ratio (that is the quantity and the concentration of the steam passed over the catalysts for the aforesaid reactions), thus increasing the yield without increasing the quantity of steam supplied from the outside, it achieved by using the embodiments and devices shown in FIGS. 1 and 2.

When increasing the quantity of steam delivered to the reforming (or conversion) units with respect to the usual amounts, one obtains accordingly a higher amount of heat in the process gas issuing from the low temperature conversion unit, in excess with respect to the quantity required for the functioning of the apparatus for the removal of $CO_2$. This excess heat is recovered by means of the heating of water or other aqueous liquid, reutilized for the saturation of the process feeds, as hereinbefore specified, and recycled to the reforming. There is obtained in this manner a circulation in closed circuit of a quantity of steam in excess with the usual amounts, which excess, as hereinbefore stated, improves the yields of the various chemical reactions on the corresponding catalysts; moreover, it compensates for the adverse effect resulting from the decrease in activity of the catalyst in time.

In other words, the object no longer consists in saving steam supplied from the outside, but on the contrary in increasing the amount of steam used in the reactions and in decreasing the concentration of $CH_4$ and CO in the outlet gases, without increasing the amount of steam (or heat) supplied from the outside. It is clear that the two objects can be simultaneously achieved at least in part.

As previously stated, an object of the present invention is to purify the condensates obtained from the units for the production of $H_2$ and from the devices connected with the latter, by desorbing the impurities present in said condensates, without further consumption of external heat, to make possible their use as boiler feed water.

This object is achieved by using the embodiment shown in FIG. 1, but better results can be achieved by using the saturation column of FIG. 3, which is particularly suitable for the purpose.

In this column, the process feed (methane, air or $CO_2$) is introduced at a low temperature, that is without any pre-heating, at the bottom of the lower zone T to recover from the water or from the purified liquid, which flows downwards, the heat present in the latter, and bring back said heat in the upper zones H and S. Water is circulated through the intermediate zone H, said water being heated by means of the waste heat yielded by means of the heat exchanger M, which may also be a reboiler. In some cases it is suitable to use two separate water circuits and to supply to each of these, heats at different temperatures by means of two separate heat exchangers. In some cases it is convenient to add to the heat supplied by means of heat exchanger M a further amount of heat from the outside by introducing steam directly by means of pipe v.

The heat supplied from the outside to said intermediate zone H and the waste heat recovered in the lower zone T are used in said zone H for purifying the waters, and especially the condensates. By means of these heats, the process feed, in the intermediate zone H, must be saturated with steam in amounts (and thus at temperatures) sufficient to remove by desorption, at the aforesaid operating pressure, the impurities present in the condensates to be purified.

As previously stated, this quantity of steam is of the order of 250 kg/$m^3$ of condensate.

One of the advantages of the present invention consists in the fact that the heat recovered in the lower zone T and the heat contained in the methane, air or $CO_2$ (compression heat) are also used in the upper zones. Therefore, the heat supplied from the outside is noticeably lower than 250 kg steam/m³ of condensate. In general, the saving is of the order of 40–45%. This is clearly shown in Example 4. However, it should be noted that a possible excess of heat supplied from the outside does not bring about an increase in heat consumption, since the saturation steam is delivered to the reforming.

The desorbing treatment, which involves the zones T and H, is also substantially carried out in the upper zone S. In this last zone condensate is introduced from the outside by means of pipe t; the process feeds discharged from the top of zone S by means of pipe 1, together with the saturation steam and the desorbed impurities, are delivered to the reforming apparatus and following apparatus, in which, as is known, the said impurities are cracked.

It should be noted that the purification of the condensates requires about 250 kg of stripping steam per m³ of condensate. Therefore, if necessary, about ¼ of the condensates may be consumed for the production of the saturation steam, whereas the remaining part of the water is purified, discharged from the column and used at another point, generally as boiler feed water.

In some cases the purification of the condensates (or other equivalent aqueous liquids) may be suitably carried out by using the embodiment shown in FIG. 4, either by means of the steam coming from the process boiler and delivered by means of pipe v, or by means of the steam deriving from the recovery and re-utilization of the waste heats obtained from the device shown in FIG. 4. With reference to FIG. 4, the saturation column comprises an upper zone S which is essentially used for purifying and regenerating the water which is fed in by means of pipe t. Steam is directly introduced at the bottom of said zone S, at the operating pressure of the reforming apparatus. The purified water, issuing from the bottom of said zone, has a temperature (generally 150°–200° C.) corresponding to the supply of the quantity of steam required for the purification in said zone. Thus this water contains an important amount of residual heat which it is necessary to recover. Therefore, in the lower zone T, the stream of process feed recovers said heat (contained in the water flowing downwards) and brings it back to the zone S, where it is combined with the steam delivered directly from the outside, and is thus also used for the purification of the water in said zone S. It is important to note that the steam fed in by means of pipe v and the waste heat recovered in zone T are finally delivered to the reforming in the form of steam of saturation of the process feed. Therefore, when operating as above, the condensate purification does not require any additional steam consumption. It should be noted that the steam, instead of being directly delivered, may also be used in an indirect manner by using a reboiler (not shown in the Figure). As an alternative, the above embodiment may be modified by passing the process feed through the lower zone T, thereby recovering the waste heats contained in the purified water flowing downwards and directly delivering these to the reforming by means of pipe n without any substantial passage through the zone S.

In the embodiment of FIG. 4, as well as in that of FIG. 3, the amount of heat supplied from the outside (that is of steam) is noticeably reduced; for example, instead of 250 kg steam/m³ of condensate, it is sufficient to use 120–170 kg.

Finally, as previously stated, it should be noted that the condensates also include the overhead condensate of the coolers for $CO_2$ and/or $H_2S$ (in which is cooled the mixture of steam and $CO_2$ and/or $H_2S$ issuing from the top of the regeneration columns of the apparatus for the removal of $CO_2$ and/or $H_2S$) and the condensates recovered at the top of possible purification columns for said condensates.

A considerable saving may be achieved by extracting from said coolers for $CO_2$ a part (or the whole) of the condensate formed in the latter, purifying said condensates according to the methods of the present invention and using said condensates as boiler feed water or discharging these to the outside in accordance with the ecological requirements. In this manner the weight balance of water in the apparatus for the removal of $CO_2$ is modified; in such a case, due to the fact that a certain amount of condensates is extracted as shown above, it is possible to supply a part of the heat to the regeneration column in the form of direct steam, which will be more economically used without having recourse to the reboiler or another heat exchange apparatus.

It is also possible to deliver to the saturation columns of FIGS. 3 and 4 the absorbent solutions used in the apparatus for removing $CO_2$, to improve their regeneration. This can easily be carried out by those skilled in the art by using various embodiments and devices.

EXAMPLE 1

In a plant for the production of $NH_3$, 28,000 N m³/h of methane to be sent to the reforming are treated in a suitable saturation column, at 30 atmospheres, in direct contact with 52 m³/h of hot water at 164° C.

The methane enters the column in dry conditions at 100° C., with a heat content of 840,000 Kcal/h and is discharged from the column in steam-saturated condition at a temperature of 160° C., with a heat content of 5,415,000 Kcal/hour. It is then delivered to the reforming.

The quantity of heat yielded to the methane by the water at 164° C., equal to 4,575,000 Kcal/h, is obtained by recovering and re-utilizing the waste heat contained in the process gas issuing from the conversion unit and in excess with respect to the amount required for the functioning of the apparatus for the removal of $CO_2$ and/or $H_2S$. The water (52 m³/h) circulating in the saturation column, as shown in FIG. 1, is heated by means of this heat from 86° C. to 164° C. The heat recovered is equal to 163 Kcal/N m³ methane.

EXAMPLE 2

In a plant similar to that of Example 1, the water (52 m³/h) is heated from 86° C. to 125° C. in a first exchanger, by using the waste heat contained in the process gas issuing from the reboiler of the apparatus for the removal of $CO_2$, and then from 125° C. to 164° C. in a second exchanger, using the heat present in the gas coming from the conversion unit, prior to the delivery of said gas to the reboiler. The heat yielded in the first exchanger (2,250,000 Kcal/h) consists of waste heat of the apparatus for the removal of $CO_2$ and/or $H_2S$ and can no longer be used for the regeneration.

EXAMPLE 3

In a plant for the production of 1,000 tons of $NH_3$ per day, 28,000 N $m^3/h$ of methane are treated in a suitable saturation column, at 30 atmospheres, in direct contact with 70.5 $m^3/h$ of water at 174° C.

The methane enters the column in dry condition at 100° C., with a heat content of 840,000 Kcal/hour, and is exited from the column in steam-saturated condition at 170° C. with a heat content of 7,042,000 Kcal/h. It is then sent to the reforming.

The heat removed by the methane, equal to 6,202,000 Kcal/h, is yielded by the said 70.5 $m^3/h$ of water which are cooled in said column from 174° C. down to 86° C. The water is then heated from 86° C. to 174° C. in another suitable column in which, as shown in FIG. 2, said water is contacted with a hot gas rich in steam, coming from the conversion unit. This gas, corresponding to a dry volume of 152,000 N $m^3/h$, has at the inlet of the column a heat content of 47,772,000 Kcal/h; after having yielded 6,202,000 Kcal/h to the water, it contains at the outlet 41,570,000 Kcal/h which are used, in a conventional manner, in the apparatus for the removal of $CO_2$ and/or $H_2S$ and in other devices.

EXAMPLE 4

In a plant for the production of $NH_3$, a saturation column is used, as shown in FIG. 3, for the purification of the process condensates (45 $m^3/h$), removing at a pressure of 35 atmospheres the gaseous impurities present in said condensates. The latter are introduced at the top of zone S at a temperature of 125° C., whereas 28,000 N $m^3/h$ of dry methane are introduced at the bottom of zone T, in countercurrent, at a temperature of 150° C., upon compression.

It is desired to carry out the purification of said condensates by using a supply of heat equal to 250 kg steam/$m^3$ of condensate. With this heat content, at the inlet of the upper zone S the methane will be saturated at 186° C. and the condensate will have, at the top of column H, a temperature of 201° C.

3,900,000 Kcal/h of heat obtained by recovering the waste heats of the apparatus for removing $CO_2$ are supplied from the outside to the zone H, by means of the exchanger M.

The water delivered to the lower zone T at a temperature of 155° C., yields its waste heat to the methane which cools said water down to 125° C. and brings back to the upper part 1,600,000 Kcal/h in the form of saturation steam. This heat is combined with 1,663,000 Kcal/h supplied by the methane which is introduced in dry condition into the lower zone T at 150° C., upon compression.

The said three amounts of heat correspond to 440,000 Kcal/$m^3$ of condensates; therefore, the mixture of methane and saturation steam has a quantity of heat equivalent to that of 250 kg steam/$m^3$ water. The methane, saturated with the said amount of steam, purifies the condensates in the zone S.

In summation, the method using the saturation column of FIG. 3 is advantageous, since only 160 kg steam/$m^3$ condensate are supplied from the outside, by recovery of waste heats, whereas the regenerative action is of 250 kg/$m^3$.

In the present example, in the case where a purification of the waters corresponding to a regenerative action of 200 kg/$m^3$ is required, the supply of external heat (recovery of residual heats) would be reduced to 114 kg/$m^3$ of condensate.

EXAMPLE 5

In a plant for the production of $NH_3$ similar to that of Example 4, the saturation column of FIG. 3 is fed with a stream of 38,000 N $m^3/h$ of air at a temperature of 150° C., instead of 28,000 N $m^3/h$ of methane as in Example 4.

Due to the this higher amount of air, there is a noticeable decrease in operating temperature in the column, whereas the amount of heat supplied from the outside (waste heat) by means of the exchanger M, is brought to about 4,400,000 Kcal/h.

It is important to note that the said waste heat, recovered and supplied to the saturation column, is directly delivered by the air to the secondary reforming, without passing through the primary reforming. This is easily allowed in the industrial practice, since this heat is only a small fraction (11%) of the overall heat necessary for the reforming.

We claim:

1. In a process for the production of hydrogen in which a first gaseous process feed comprising gaseous hydrocarbons is reacted with steam in a reforming unit, in which the resulting reaction gases are then reacted with a second gaseous process feed comprising air and with steam in shift conversion units, in which the resulting conversion gases are treated in an unit for the removal of $CO_2$ and/or $H_2S$ in which steam necessary for the said reactions is produced in a process boiler by means of the heat obtained from said units, and in which the condensation waters obtained from said units and the water feeding the boiler are purified, the improvement which comprises:
    (a) recovering and re-utilizing the waste heat contained in the gases and the liquids issuing from said units to heat condensation water obtained from said units to a temperature lower than the boiling temperature of water at the operating pressure of said units;
    (b) delivering at least part of the gaseous process feeds at a temperature lower than the temperature to the heated aqueous liquid from step (a) first to a saturation column, contacting therein said gaseous process feeds with the said condensation water heated in (a), and using the recovered heat contained in said condensation water to saturate said gaseous process feeds with steam at a temperature lower than the boiling temperature at the operating pressure of reforming;
    (c) using the resulting mixture of gaseous process feeds and steam obtained in (b) to remove from said condensation water of (a) the gaseous impurities present in the latter by desorption at the operating pressure of said units; and
    (d) heating the resulting mixture of gaseous process feed, steam and gaseous impurities obtained in (c) and delivering it to the reforming unit together with a further amount of steam obtained from the process boiler.

2. The process of claim 1, in which the saturation zone is divided into a lower, an intermediate and an upper zone; the said condensation water is introduced at the top of said upper zone and its passed downwards in countercurrent with said gaseous process feeds which are introduced at the bottom of said lower zone; the said gaseous process feeds recover the waste heat contained in the purified and hot condensation water coming from the upper and intermediate zones and bring it back in the form of saturation steam to said intermediate and upper zones; in said intermediate zone heat is supplied from the outside by means of the heating of the condensation water as in (a); this heat supplied from the outside is delivered, together with the heat coming from the lower zone, to the upper zone in the form of saturation steam, by means of said gaseous process feeds, and said saturation steam is used in said upper zone to purify the condensation water at the operating pressure of said units, this desorbing gaseous impurities present in said condensation water; and the resulting mixture of gaseous process feeds saturation steam and desorbed impurities is then delivered to the reforming unit.

3. The process of claim 1, in which the saturation zone is divided into a lower and an upper zone; the said condensation water is introduced at the top of said upper zone and is passed through the saturation zone in countercurrent with the gaseous process feeds which are introduced at the bottom of said lower zone; in said lower zone the gaseous process feeds recover the waste heat contained in the purified and hot condensation water coming from said upper zone and bring it back in the form of saturation steam to said upper zone; heat is supplied from the outside at the bottom of said upper zone, thus producing additional steam which is combined with the said saturation steam; the combined steams are used to treat in direct contact the condensation water, thus purifying said condensation water and desorbing gaseous impurities present in the latter; and the resulting mixture of gaseous process feeds, saturation steam and desorbed impurities is then delivered to the reforming unit.

4. The process of claim 1, in which the heat supplied from the outside by delivery of the recovered waste heats is integrated by means of the addition of make-up steam obtained from the process boiler.

5. The process of claim 1, in which at least a part of said condensation water consists of overhead condensate of coolers for the mixture of steam and $CO_2$ and/or $H_2S$ issuing from a regeneration column of said unit for the removal of $CO_2$ and/or $H_2S$; said overhead condensate is delivered to the saturation zone and purified therein to an extent sufficient to permit said overhead condensate to be discharged to the outside of said unit for the removal of $CO_2$ and/or $H_2S$; and, due to the discharge of said overhead condensate to the outside, a part of the heat supplied to said regeneration column consists of direct steam.

6. The process of claim 1, in which at least a part of said condensation water consists of condensate produced in the reflux coolers of purification columns in which the condensation waters of said units for the production of hydrogen are treated by steam stripping.

7. In a process for the production of hydrogen in which a first gaseous process feed comprising gaseous hydrocarbons is reacted with steam in a reforming unit, in which the resulting reaction gases are then reacted with a second gaseous process feed comprising air and with steam in shift conversion units, in which the resulting conversion gases are treated in an unit for the removal of $CO_2$ and/or $H_2S$ in which steam necessary for the said reactions is produced in a process boiler by means of the heat obtained from said units, and in which the condensation waters obtained from said units and the water feeding the boiler are purified, the improvement which comprises:

(a) recovering and re-utilizing the waste heat contained in the gases and the liquids issuing from said units to heat an aqueous liquid to a temperature lower than the boiling temprature of water at the operating pressure of said units;

(b) delivering at least part of the gaseous feeds at a temperature lower than the temperature of the heated aqueous liquid from step (a) first to a saturation zone, contacting therein said gaseous process feeds with the said aqueous liquid heated in (a), and using the recovered heat contained in said aqueous liquid to saturate said gaseous process feeds with steam at a temperature lower than the boiling temperature at the operating pressure of reforming; and (c) heating the resulting mixture of gaseous process feeds and saturation steam obtained in (b) and delivering said mixture to the reforming unit together with a further amount of steam obtained from the process boiler.

8. The process of claim 7, in which the heat supplied from the outside by means of the delivery of said recovered waste heats is integrated by addition of make-up steam obtained from the process boiler.

9. In a process for the production of hydrogen in which a first gaseous process feed comprising gaseous hydrocarbons is reacted with steam in a reforming unit, in which the resulting reaction gases are then reacted with a second gaseous process feed comprising air and with steam in shift conversion units, in which the resulting conversion gases are treated in a unit for the removal of $CO_2$ and/or $H_2O$ in which steam necessary for the said reactions is produced in a process boiler by means of the heat obtained from said units, and in which the condensation waters obtained from said units and the water feeding the boiler are purified, the improvement which comprises:

(a) recovering and re-utilizing the waste heat contained in the gases and the liquids issuing from said units for the production of hydrogen to heat at least a part of an absorbent solution used in said unit for the removal of $CO_2$ and/or $H_2S$ to a temperature lower than the boiling temperature of water at the operating pressure of said units;

(b) delivering the gaseous process feeds of said reforming and conversion units at a temperature lower than the temperature than the heated aqueous liquid from step (a) first to a saturation column, contacting therein said gaseous process feeds with the absorbent solution heated in (a), and using the recovered heat contained in said absorbent solution to saturate said gaseous process feeds with steam at a temperature lower than the boiling temperature of water at the operating pressure of reforming;

(c) using the resulting mixture of gaseous process feeds and saturation steam obtained in (b) to remove from said absorbent solution of (a) a part of the $CO_2$ and/or $H_2S$ present in the latter by desorption at the operating pressure of said units for the production of hydrogen; and (d) heating the resulting mixture of gaseous process feeds, saturation steam and desorbed $CO_2$ and/or $H_2S$ obtained in (c) and delivering it to the reforming unit together with a further amount of steam obtained from the process boiler.

* * * * *